United States Patent
Aoyama

(10) Patent No.: US 10,724,644 B2
(45) Date of Patent: Jul. 28, 2020

(54) FLUID CONTROL VALVE

(71) Applicant: CKD CORPORATION, Komaki-shi, Aichi (JP)

(72) Inventor: Tatsuhito Aoyama, Kasugai (JP)

(73) Assignee: CKD CORPORATION, Komaki-shi (JP)

( * ) Notice: Subject to any disclaimer, the term of this patent is extended or adjusted under 35 U.S.C. 154(b) by 0 days.

(21) Appl. No.: 16/090,900

(22) PCT Filed: May 18, 2017

(86) PCT No.: PCT/JP2017/018633
§ 371 (c)(1),
(2) Date: Oct. 3, 2018

(87) PCT Pub. No.: WO2017/217179
PCT Pub. Date: Dec. 21, 2017

(65) Prior Publication Data
US 2019/0128433 A1 May 2, 2019

(30) Foreign Application Priority Data
Jun. 17, 2016 (JP) ................................. 2016-120568

(51) Int. Cl.
*F16K 7/17* (2006.01)
*F16K 47/08* (2006.01)
(Continued)

(52) U.S. Cl.
CPC .............. *F16K 7/16* (2013.01); *F16K 31/143* (2013.01); *F16K 47/08* (2013.01)

(58) Field of Classification Search
CPC .......... F16K 7/16; F16K 31/143; F16K 47/08; F16K 7/17; F16K 31/1225
See application file for complete search history.

(56) References Cited

U.S. PATENT DOCUMENTS 5,108,069 A * 4/1992 Tada ........................ F16K 7/16
251/58
6,105,930 A * 8/2000 Nishimura .............. F16K 31/56
251/102
(Continued)

FOREIGN PATENT DOCUMENTS

JP 2000-075931 A 3/2000
JP 4137267 B2 8/2008
(Continued)

OTHER PUBLICATIONS

Nov. 14, 2017 Office Action issued in Japanese Patent Application No. 2016-120568.
(Continued)

Primary Examiner — Marina A Tietjen
(74) Attorney, Agent, or Firm — Oliff PLC

(57) ABSTRACT

A fluid control valve for controlling high-temperature fluid includes: a valve body including a valve chamber communicating with first and second flow passages, and a valve seat provided in the valve chamber; a metal diaphragm that contacts with and separates from the valve seat; a stem that moves the metal diaphragm up and down; and an actuator that drives the stem. The first flow passage includes a first orifice having a diameter set to 50% or less of a diameter of the second flow passage. Alternatively, the second flow passage includes a second orifice having a diameter set to 50% or less of the diameter of the second flow passage. The diameter of the second flow passage is calculated by converting a cylindrical flow passage area defined between the valve seat and the metal diaphragm when separated from the valve seat into a diameter of a circular flow passage.

5 Claims, 9 Drawing Sheets

(51) Int. Cl.
*F16K 31/143* (2006.01)
*F16K 31/122* (2006.01)
*F16K 7/16* (2006.01)

(56) References Cited

U.S. PATENT DOCUMENTS

| | | | | |
|---|---|---|---|---|
| 2004/0094740 | A1* | 5/2004 | Itoi | F16K 1/42 |
| | | | | 251/331 |
| 2004/0099311 | A1* | 5/2004 | Fukano | F16K 7/16 |
| | | | | 137/312 |
| 2006/0175573 | A1* | 8/2006 | Ohmi | F16K 7/16 |
| | | | | 251/331 |
| 2007/0075284 | A1* | 4/2007 | Masamura | F16K 7/17 |
| | | | | 251/63.5 |
| 2008/0078968 | A1* | 4/2008 | Fukano | F16K 7/16 |
| | | | | 251/122 |
| 2012/0097881 | A1* | 4/2012 | Aoyama | F16K 1/425 |
| | | | | 251/359 |
| 2013/0019965 | A1 | 1/2013 | Mooney | |
| 2014/0077109 | A1* | 3/2014 | Miyashita | F16K 31/122 |
| | | | | 251/63.5 |
| 2014/0319403 | A1* | 10/2014 | Kitano | F16K 7/16 |
| | | | | 251/331 |
| 2014/0346385 | A1* | 11/2014 | Hasunuma | F16K 31/1221 |
| | | | | 251/278 |
| 2015/0253783 | A1 | 9/2015 | Hata et al. | |
| 2016/0363231 | A1* | 12/2016 | Yasumoto | F16K 7/14 |

FOREIGN PATENT DOCUMENTS

| | | |
|---|---|---|
| JP | 5546018 B2 | 7/2014 |
| JP | 2015-170185 A | 9/2015 |

OTHER PUBLICATIONS

Aug. 8, 2017 International Search Report issued in International Patent Application No. PCT/JP2017/018633.
Aug. 8, 2017 Written Opinion issued in International Patent Application No. PCT/JP2017/018633.
May 30, 2019 Office Action issued in Chinese Application No. 201780026342.2.
Mar. 31, 2020 Office Action issued in Chinese Patent Application No. 201780026342.2.

* cited by examiner

FLUID CONTROL VALVE

CROSS-REFERENCE TO RELATED APPLICATIONS

This is a US national phase application based on the PCT International Patent Application No. PCT/JP2017/018633 filed on May 18, 2017, and claiming the priority of Japanese Patent Application No. 2016-120568 filed on Jun. 17, 2016, the entire contents of which are herewith incorporated by reference.

TECHNICAL FIELD

The present invention relates to a fluid control valve for controlling high-temperature fluid, the fluid control valve including a valve body that includes a valve chamber communicating with a first flow passage and a second flow passage and a valve seat provided in the valve chamber, a metal diaphragm configured to contact with or separate from the valve seat, a stem configured to move the metal diaphragm up and down, and an actuator configured to drive the stem.

BACKGROUND ART

As a technique to deposit thin films in a semiconductor manufacturing process, there is atomic layer deposition (hereinafter, ALD). In this ALD, gas is supplied in small amounts. For accurate supply of such small amounts of gas, it is necessary to stabilize a Cv value or factor.

In the ALD, for example, a high-temperature gas at about 200° C., such as liquefied titanium (a boiling point: 160° C.), is supplied. For resistance to the high-temperature gas, therefore, a metal diaphragm made of nickel-cobalt alloy having a thickness of 0.1 mm is used. However, when moved by the stem, the metal diaphragm having a thin plate-like shape exhibits unstable behavior and thus the Cv value becomes unstable. This is conceivable because the metal diaphragm will abruptly change at a certain point of time due to metal characteristics of the metal diaphragm.

The stability of the Cv value has been demanded in the ALD, whereas a problem occurs that the Cv value becomes unstable during supply of high-temperature gas. Therefore, there has been a demand for a diaphragm fluid control valve with a Cv value whose rate of variation or change is small even during supply of high-temperature gas. A technique for such a fluid control valve having a Cv value with a small variation rate during supply of high-temperature gas is disclosed in Patent Document 1 whose application was filed by the present applicant. A fluid control valve 100 shown in FIG. 10 is configured to adjust the stroke of a diaphragm in order to reduce the variation rate of the Cv value during supply of high-temperature gas. In this fluid control valve 100, the variation rate of the Cv value is ±10%.

RELATED ART DOCUMENTS

Patent Documents

Patent Document 1: Japanese Patent No. 5546018
Patent Document 2: Japanese Patent No. 4137267
Patent Document 3: Japanese Unexamined Patent Application Publication No. 2000-75931

SUMMARY OF INVENTION

Problems to be Solved by the Invention

However, the conventional fluid control valve 100 has the following problems.

Reducing the variation rate of the Cv value during supply of high-temperature gas to within ±10% is a reasonable range in the current ALD. However, the fluid control valve 100 needs a control unit to adjust the stroke, resulting in an increased number of parts or components, leading to cost rise.

In recent years, furthermore, the ALD has an increased need to supply small amounts of gas with accuracy. A fluid control valve has been demanded for high accuracy with a small variation rate of the Cv value (a variation rate of ±5% or less). The conventional fluid control valve 100 could not realize such a highly-accurate fluid control valve.

As shown in Patent documents 2 and 3, moreover, there is generally known a configuration that an orifice is provided in a flow passage to control the amount of gas to be supplied. However, those documents have no concrete description of the diameter of the orifice. In particular the Cv value during supply of high-temperature gas has not been indefinite.

The present invention has been made to solve the above problems and has a purpose to provide a fluid control valve having a Cv value with a small rate of variation to ensure a stable flow rate even in supplying high-temperature fluid.

Means of Solving the Problems

To achieve the above purpose, one aspect of the invention provides a fluid control valve configured as below.

(1) A fluid control valve for controlling high-temperature fluid, the fluid control valve comprises: a valve body including: a valve chamber communicating with a first flow passage and a second flow passage; and a valve seat provided in the valve chamber; a metal diaphragm configured to contact with or separate from the valve seat; a stem configured to move the metal diaphragm up and down; and an actuator configured to drive the stem, wherein the first flow passage includes a first orifice having a diameter set to 50% or less of a diameter of the second flow passage, or, the second flow passage includes a second orifice having a diameter set to 50% or less of the diameter of the second flow passage, and the diameter of the second flow passage is a diameter calculated by converting a cylindrical flow passage area defined between the valve seat and the metal diaphragm when separated from the valve seat into a diameter of a circular flow passage.

(2) In the fluid control valve described in (1), the diameter of the first orifice is 40% or less of the diameter of the second flow passage, or, the diameter of the second orifice is 40% or less of the diameter of the second flow passage.

Effects of the Invention

The fluid control valve of the present invention having the above characteristics can provide the following operations and effects.

Since the diameter of the orifice formed in the first or second flow passage is set to 50% or less of the diameter of the second flow passage, the variation rate of the Cv value can be reduced to within ±10% or less even in supplying high-temperature fluid. The orifice has only to be formed in the flow passage, so that the fluid control valve can control a flow rate with high accuracy without additionally providing a separate control unit.

Since the diameter of the orifice is set to 40% or less of the diameter of another flow passage, the variation rate of the Cv value can be reduced to within ±5% or less even in supplying high-temperature fluid. The present invention can thus provide a highly-accurate fluid control valve with a Cv value whose variation rate is small (a variation rate of ±5% or less) in the ALD, as recently demanded in industry.

MODE FOR CARRYING OUT THE INVENTION

A detailed description of a preferred embodiment of a fluid control valve embodying the present invention will now be given referring to the accompanying drawings.

First Embodiment (Configuration)

Figure 1:
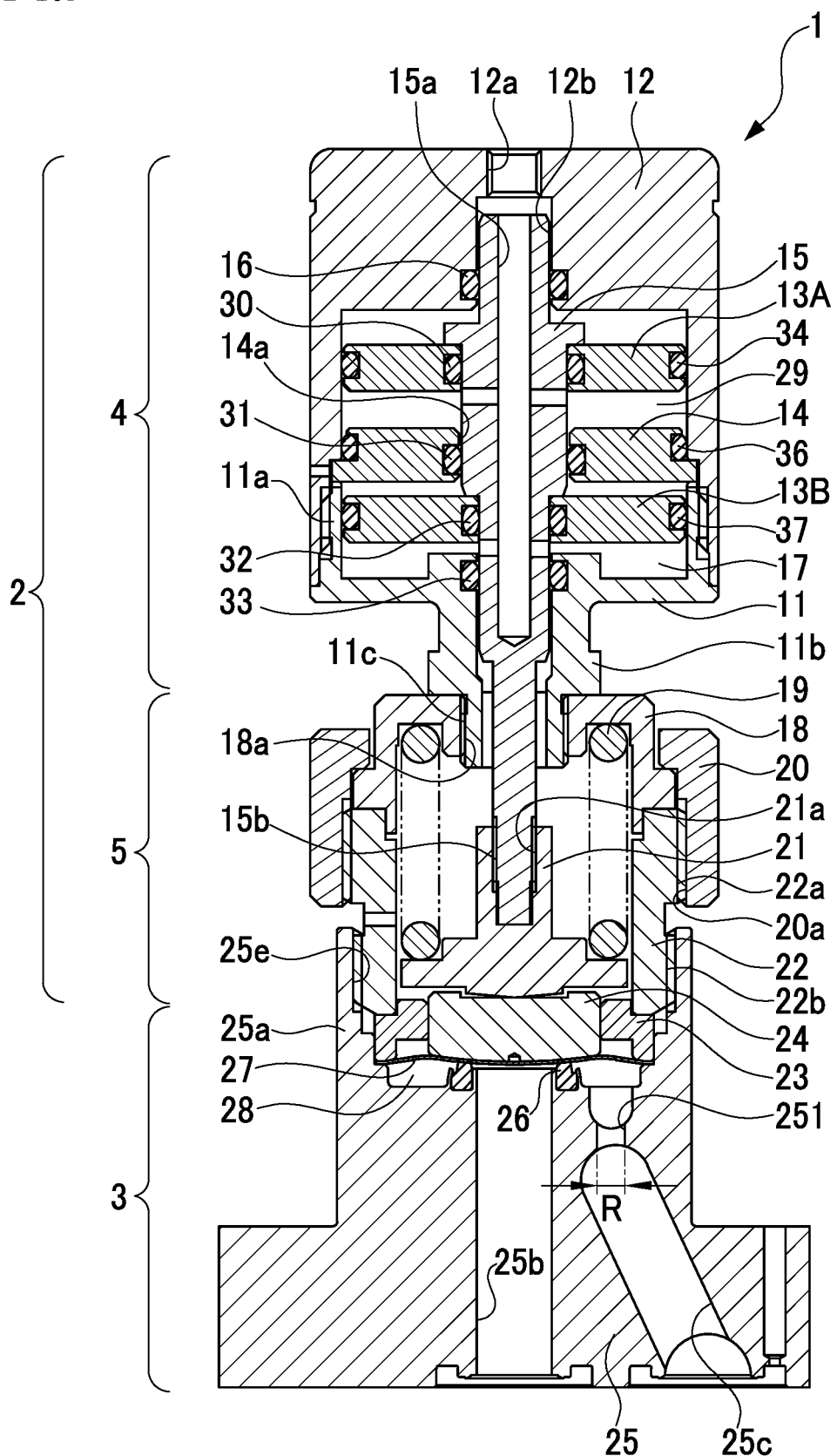
FIG. 1 is a sectional view of an entire fluid control valve in a first embodiment of the present invention, showing a valve closed state of a metal diaphragm.
Figure 2:
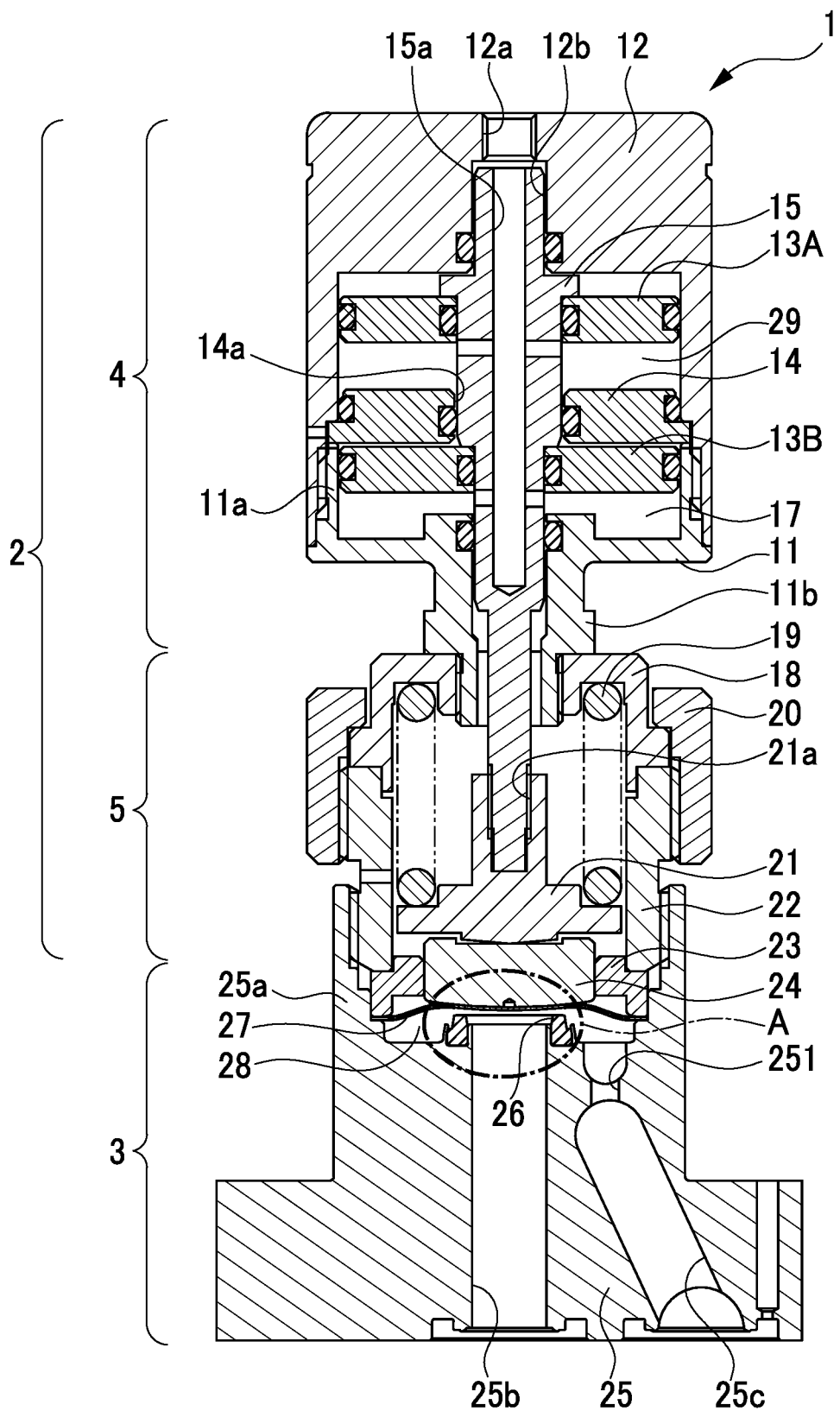
FIG. 2 is a sectional view of the entire fluid control valve in the first embodiment of the present invention, showing a valve open state of the metal diaphragm.
Figure 3:
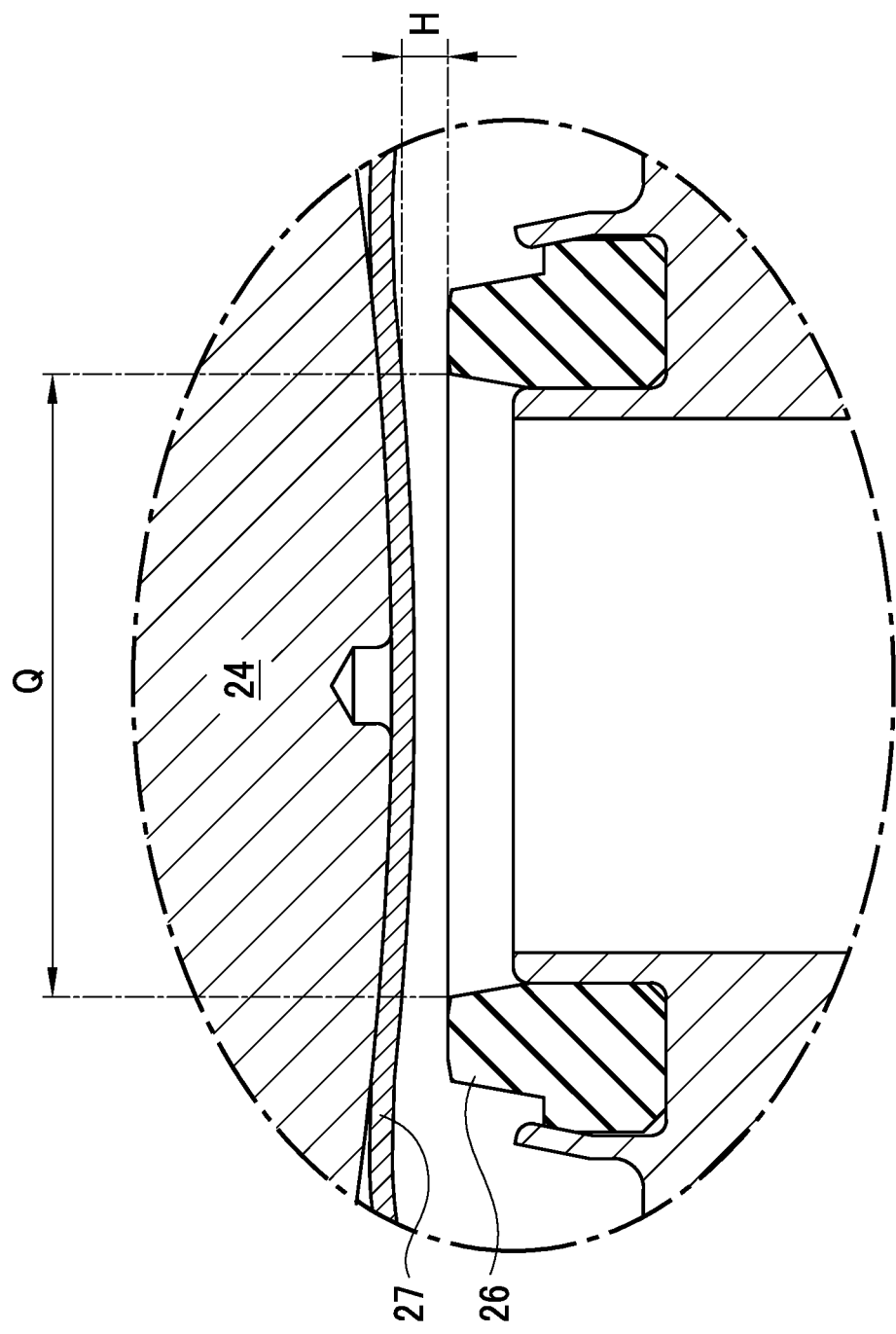
FIG. 3 is an enlarged view of a part A in FIG. 2.

The configuration of a fluid control valve 1 in the first embodiment of the present invention will be described first with reference to FIGS. 1 and 2. FIGS. 1 and 2 are each a sectional view of the entire fluid control valve 1. FIG. 1 shows a valve closed state of a metal diaphragm 27 and FIG. 2 is a valve open state of the same. FIG. 3 is an enlarged view of a part A in FIG. 2.

The fluid control valve 1 is to be incorporated in a gas supply system of a semiconductor manufacturing apparatus to control supply of high-temperature gas at about 200° C. The fluid control valve 1 is a normally-closed type, air-operated opening/closing valve. The fluid control valve 1 is constituted of an actuator unit 2 and a valve unit 3. The actuator unit 2 includes an air cylinder part 4 and a spring part 5.

The air cylinder part 4 is first explained. As shown in FIG. 1, a cylindrical cylinder case 12 threadedly engages from above with a cylinder base 11 located at the bottom of the air cylinder part 4. On the upper side of the cylinder base 11, an upper flange 11a extends upward. The cylinder case 12 internally holds an upper piston 13A in a slidable manner, while the upper flange 11a internally holds a lower piston 13B in a slidable manner. An intermediate plate 14 is fixedly placed between the upper and lower pistons 13A and 13B. The intermediate plate 14 is formed, at its center, with a guide hole 14a for guiding upward/downward movement of a piston rod 15 coupled to the upper and lower pistons 13A and 13B.

The cylinder case 12 is formed with a pilot port 12a and a guide hole 12b extending through the center of an upper end portion of the cylinder case 12. The guide hole 12b serves to guide the upward/downward movement of the piston rod 15. The piston rod 15 is formed with a feed hole 15a to deliver operating air (compressed air) supplied thereto through the pilot port 12a. Through the feed hole 15a, the operating air is thus delivered into a pressure chamber 29 defined between the upper piston 13A and the intermediate plate 14 and also to a pressure chamber 17 defined between the lower piston 13B and the cylinder base 11. As the operating air is fed to the pilot port 12a, the upper piston 13A, the lower piston 13B, and the piston rod 15 are moved upward (in a valve opening direction).

An O ring 16 is placed between the inner peripheral surface of the cylinder case 12 and the outer peripheral surface of the piston rod 15. An O ring 30 is placed between the inner peripheral surface of the upper piston 13A and the outer peripheral surface of the piston rod 15. An O ring 31 is placed between the inner peripheral surface of the intermediate plate 14 and the outer peripheral surface of the piston rod 15. An O ring 32 is placed between the inner peripheral surface of the lower piston 13B and the outer peripheral surface of the piston rod 15. An O ring 33 is placed between the inner peripheral surface of the cylinder base 11 and the outer peripheral surface of the piston rod 15.

Furthermore, an O ring 34 is placed between the outer peripheral surface of the upper piston 13A and the inner peripheral surface of the cylinder case 12. An O ring 36 is placed between the outer peripheral surface of the intermediate plate 14 and the inner peripheral surface of the cylinder case 12. An O ring 37 is placed between the outer peripheral surface of the lower piston 13B and the inner peripheral surface of the cylinder base 11.

The spring part 5 is described below. A lower end of the cylinder base 11 is formed with a lower flange 11b as shown in FIG. 1. The lower flange 11b abuts on the upper surface of a spring retainer 18 that holds a compression spring 19 for downward urging (in a valve closing direction). The lower flange 11b is formed, on its lower part, with male threads 11c, which are threadedly coupled with female threads 18a formed on the inner peripheral surface of the spring retainer 18. The penetrating piston rod 15 is formed, on its lower end, with male threads 15b which are threadedly coupled with male threads 21a formed at the center of an upper end of a first stem 21. Therefore, upward drive power of the piston rod 15 is transmitted to the first stem 21.

The lower end of the compression spring 19 abuts on the upper surface of an outer peripheral part of the first stem 21. Thus, the elastic force of the compression spring 19 presses the first stem 21 downward. Under the spring retainer 18, a hollow adaptor 22 is placed. In this adaptor 22, the compression spring 19 and the first stem 21 are located. The adaptor 22 includes an upper part formed, on its outer peripheral surface thereof, with first male threads 22a which are threadedly coupled with female threads 20a formed on the inner peripheral surface of the lock nut 20. The inner peripheral surface of an upper part of the lock nut 20 engages the spring retainer 18. Tightening the lock nut 20 causes the adaptor 22 to be coupled together with the spring retainer 18.

The outer peripheral surface of a lower part of the adaptor 22 is formed with second male threads 22b which are threadedly coupled with female threads 25e formed on the inner peripheral surface of a cylindrical part 25a provided protruding on an upper end of a valve body 25 constituting the valve unit 3. The lower end of the adaptor 22 abuts on the upper surface of a holder 23. This holder 23 is placed on the upper surface of an outer peripheral edge of the metal diaphragm 27 to hermetically hold and press the metal diaphragm 27 against the bottom surface of a valve chamber 28.

The valve unit 3 will be described below. As shown in FIG. 1, inside the cylindrical part 25a provided protruding on the upper end of the valve body 25, there are formed a second flow passage 25b on an input side and the valve chamber 28 communicating with a first flow passage 25c on an output side. In the bottom surface of the valve chamber 28, a valve seat 26 is provided at a position for communication with the second flow passage 25b. The valve seat 26 is made of a material superior in heat resistance, PI (polyimide) or PFA (Polytetrafluoroethylene-perfluoroalkyl vinyl ether copolymer). The valve seat 26 is joined to the valve body 25 by caulking. Above the valve seat 26, the metal diaphragm 27 bulging upward is placed so as to contact with or separate from the valve seat 26. The metal diaphragm 27 is formed of a plurality of thin films made of nickel-cobalt alloy in a laminated fashion and pressure-bonded into a sheet-like form. Concretely, the metal diaphragm 27 is produced in a manner that three thin films each having a thickness of 0.1 mm are laminated with a center portion bulging by a bulged amount of 0.9 mm in a free state. Furthermore, the metal diaphragm 27 is subjected to heat treatment to enhance the strength, so that the metal diaphragm 27 has a hardness of 500 Hv or more in terms of Vickers hardness. A lower end of a second stem 24 abuts on the upper surface of the metal diaphragm 27.

The second stem 24 has a nearly circular columnar shape with a lower end curved to smoothly bulge downward. At the stage (an initial stage) of attaching the metal diaphragm 27 to the valve body 25, the shape of the metal diaphragm 27 is limited along the curved surface of the second stem 24. Even during valve opening, the metal diaphragm 27 remains pressed against the second stem 24 and thus maintains its shape along the curved surface of the second stem 24.

Figure 4:
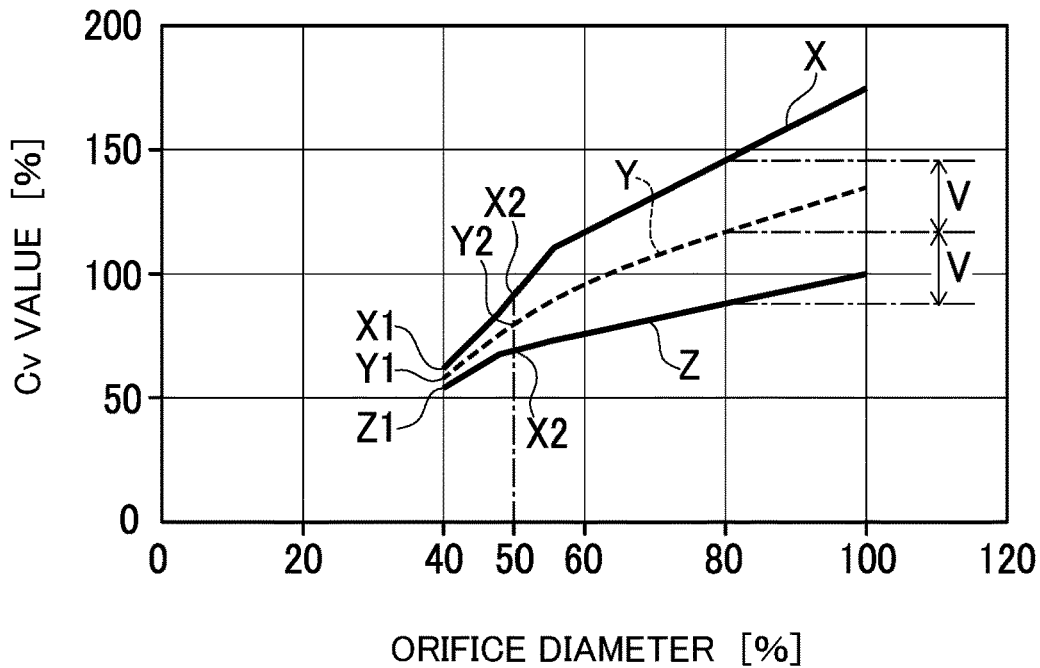
FIG. 4 is a graph depicting a relationship between an orifice diameter and a Cv value obtained by use of the fluid control valve in the first embodiment of the present invention.
Figure 5:
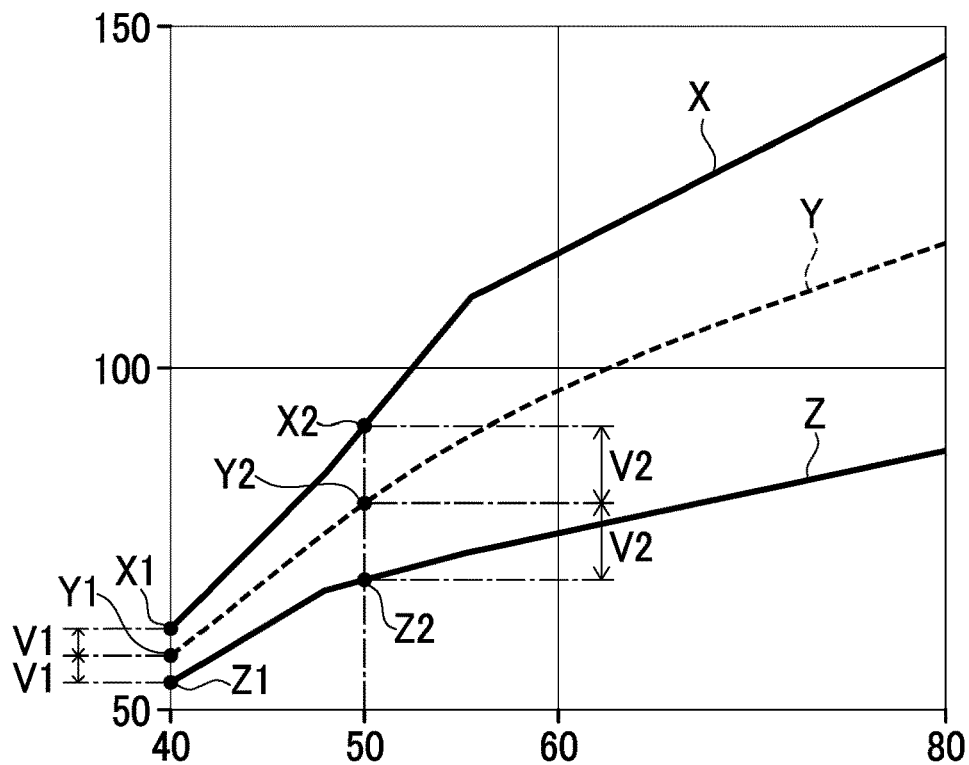
FIG. 5 is a graph enlargedly showing a part of the graph in FIG. 4.

Next, the configuration of flow passages formed in the valve body 25, which is a feature of the fluid control valve 1 in the first embodiment, will be described with reference to FIGS. 1, 4, and 5. FIG. 4 is a graph depicting a relationship between the orifice diameter and the Cv value obtained by use of the fluid control valve 1. In the graph, a vertical axis represents the Cv value and a horizontal axis represents the ratio of the diameter of an orifice 251 formed in the first flow passage 25c to the second flow passage 25b. A solid line X indicates the maximum value of the Cv value and a solid line Z indicates the minimum value of the Cv value. A dotted line Y represents the intermediate point between the solid line X and the solid line Z. A length V indicates the variation range of the Cv value. A length V from the dotted line Y to the solid line X is equal to a length V from the dotted line Y to the solid line Z. As the diameter of the orifice 251 is closer to the same diameter (100%) as the second flow passage 25b, the variation range of the Cv value is larger. The variation rate of the Cv value is obtained by ±V/Y. FIG. 5 is an enlarged graph of a part of FIG. 4, corresponding to a range of 50% to 150% in the vertical axis representing the Cv value and a range of 40% to 80% in the horizontal axis representing the ratio of the diameter of the orifice 251 formed in the first flow passage 25c to the diameter of the second flow passage 25b.

As shown in FIG. 1, the first flow passage 25c is formed with the orifice 251. The diameter R of this orifice 251 is set to 50% of a diameter of a circular flow passage calculated by converting a cylindrical flow passage area, i.e., an area of a cylindrical surface, (approximately QπH) of a cylindrical flow passage (i.e., a circumferential opening) defined between the valve seat 26 having an inner diameter Q at its distal end and the metal diaphragm 27 when separated from the valve seat 26 into the diameter of the circular flow passage having a circular cross-section equal to the approximately QπH, as shown in FIG. 3. Specifically, since the flow passage area (approximately QπH) defined between the valve seat 26 and the metal diaphragm 27 is smaller than the cross-sectional area of the second flow passage 25b, the flow passage area defined between the valve seat 26 and the metal diaphragm 27 is targeted for the conversion. When the diameter R of the orifice 251 is 50% of the diameter of the circular flow passage, according to a maximum value X2, a minimum value Z2, and an intermediate value Y2 of the Cv value in FIG. 5, which are experimentally obtained data, the variation rate of the Cv value can be reduced to ±10% (±V2/Y2).

Herein, since the metal diaphragm 27 has a hardness of 500 Hv or more in terms of Vickers hardness, the shape of the metal diaphragm 27 abruptly changes at a certain point of time. Accordingly, in the case of 100% in FIG. 4, corresponding to no orifice, the metal diaphragm 27 unstably behaves and thus the variation rate of the Cv value is as large as ±37%. In contrast, in the case that the orifice 251 is formed in the first flow passage 25c, the variation rate of the Cv value could be reduced to ±10%. This is conceivable because, even when the metal diaphragm abruptly changes, resulting in a sudden change in pressure, the flow rate is limited by the orifice and thus the variation rate of the Cv value is kept small.

In the present embodiment, the diameter R of the orifice 251 is set to 50% or less of the diameter of the circular flow passage. Furthermore, when it is set to 40% or less, a maximum value X1, a minimum value Z1, and an intermediate value Y1 of the Cv value as shown in FIG. 5 can be obtained. The variation rate of this Cv value is further reduced to be as smaller as ±5% or less (±V1/Y1). Accordingly, a more highly-accurate fluid control valve can be achieved to meet a demand for accurate gas supply in recent industry.

In the present embodiment, as described above, the orifice 251 is formed in the first flow passage 25c. Instead of forming the orifice 251 in the first flow passage 25c, an orifice (not shown) may be formed in the second flow passage 25b. When the diameter of the orifice formed in the second flow passage 25b is set to 50% or less of the diameter of the circular flow passage, the variation rate of the Cv value can be 10% or less. When the diameter of the orifice formed in the second flow passage 25b is further set to 40% or less of the diameter of the circular flow passage, the variation rate of the Cv value can be ±5% or less. At that time, the diameter of the circular flow passage represents a diameter calculated by converting a cylindrical flow passage area defined between the valve seat 26 and the metal diaphragm 27 when separated from the valve seat 26 into the diameter of a circular flow passage.

(Explanation of Operations)

Next, operations of the fluid control valve 1 will be explained.

When operating air is supplied to the fluid control valve 1 through the pilot port 12a, as shown in FIG. 1, the operating air is delivered into the pressure chambers 17 and 29, thereby moving the upper piston 13A and the lower piston 13B and the piston rod 15 upward (in the valve opening direction). The first stem 21, coupled to the piston rod 15, is also moved upward to an upper limit position against the elastic force of the compression spring 19. The second stem 24 having been restrained from moving upward by the first stem 21 is caused to move upward by the restoring force of the metal diaphragm 27. The metal diaphragm 27 then separates from the valve seat 26 into the valve open state. When the metal diaphragm 27 is placed in the valve open state, high-temperature gas is allowed to flow into the first flow passage 25c by passing through the second flow passage 25b and the valve chamber 28.

On the other hand, when supply of the operating air to the fluid control valve 1 through the pilot port 12a is stopped, as shown in FIG. 2, the first stem 21 is driven downward (in the valve closing direction) by the elastic force of the compression spring 19. The first stem 21 moves downward together with the second stem 24 while restraining upward movement of the second stem 24. In association with the downward movement of the second stem 24, the metal diaphragm 27 is brought into contact with the valve seat 26 and thus placed in the valve closed state. When the metal diaphragm 27 is placed in the valve closed state, supply of high-temperature gas to the first flow passage 25c is stopped.

Second Embodiment

Figure 6:
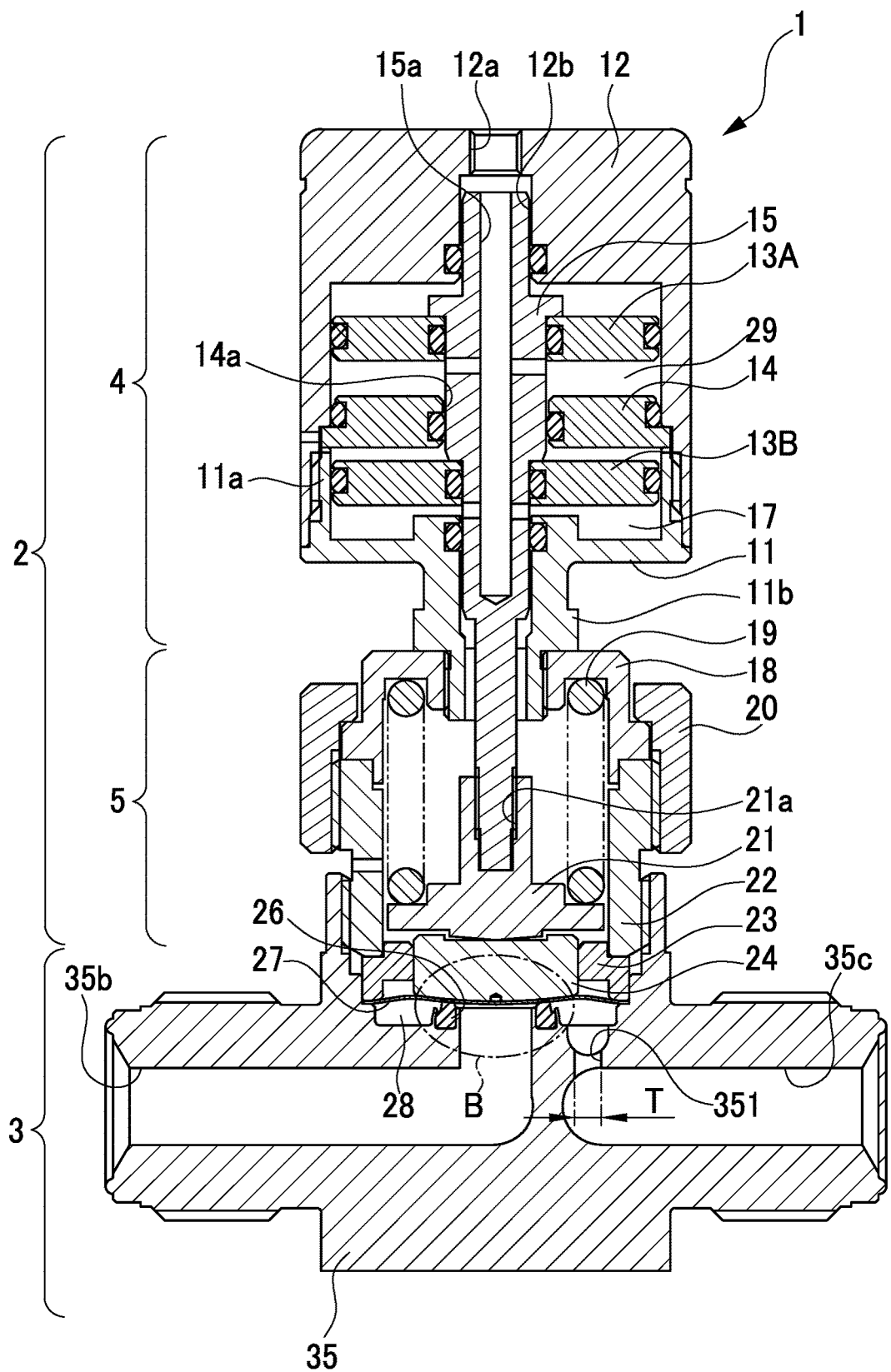
FIG. 6 is a sectional view of an entire fluid control valve in a second embodiment of the present invention, showing a valve closed state of a metal diaphragm.
Figure 7:
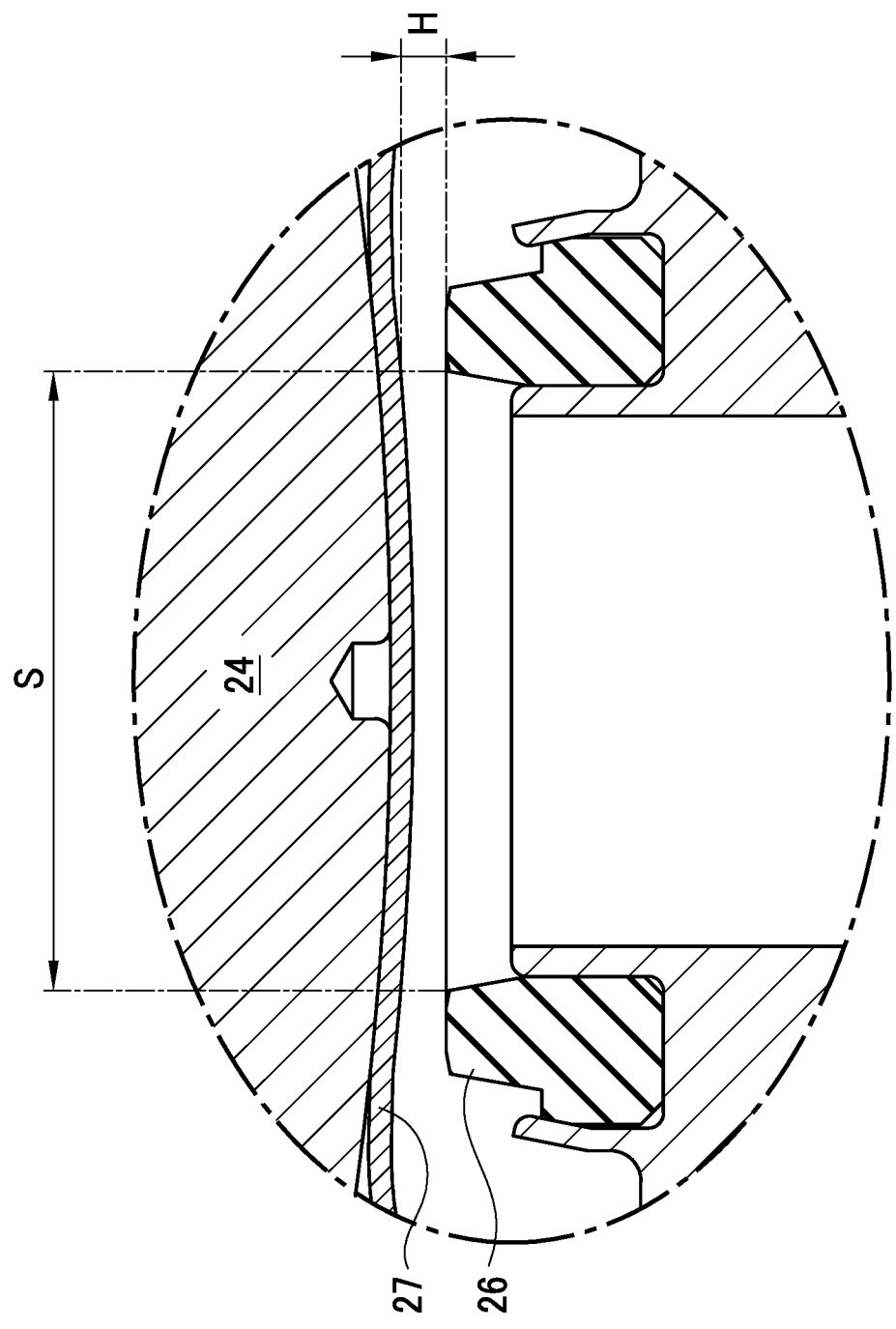
FIG. 7 is an enlarged view of a part B in FIG. 6, showing a valve open state of the metal diaphragm.

The configuration of a fluid control valve 1 in a second embodiment of the present invention will be described below with reference to FIGS. 6 and 7. FIG. 6 is a sectional view of the fluid control valve 1 in the second embodiment. FIG. 7 is an enlarged view of a part B in FIG. 6, showing a valve open state of the metal diaphragm 27.

The second embodiment differs from the first embodiment in the shape of flow passages in a valve body. Like components to those in the fluid control valve 1 in the first embodiment are assigned the same reference signs as those in the first embodiment and their details are omitted.

As shown in FIG. 6, a valve body 35 is formed with a second flow passage 35b on an input side and a first flow passage 35c on an output side. In the valve body 35, a first port of the first flow passage 35c and a second port of the second flow passage 35b are provided in opposite side surfaces of the valve body 35. The first flow passage 35c is formed with an orifice 351. The diameter T of the orifice 351 is set to 50% or less of the diameter of a circular flow passage calculated by converting a cylindrical flow passage area, i.e., an area of a cylindrical surface, (approximately S$\pi$H) of a cylindrical flow passage (i.e., a circumferential opening) defined between the valve seat 26 having an inner diameter S at its distal end and the metal diaphragm 27 when separated from the valve seat 26 into the diameter of the circular flow passage having a circular cross-section equal to the approximately S$\pi$H, as shown in FIG. 7. When the diameter T of the orifice 351 is set to 50% or less of the diameter of the circular flow passage, the variation rate of the Cv value is ±10% or less. Furthermore, when the diameter T of the orifice 351 is set to 40% or less of the diameter S of the second flow passage 35b, the variation rate of the Cv value is ±5% or less.

According to the fluid control valve 1 of the present invention, as described above, (1) the fluid control valve 1 configured to control high-temperature gas includes: the valve body 25, 35 including the valve chamber 28 communicating with the first flow passage 25c, 35c and the second flow passage 25b, 35b and the valve seat 26 provided in the valve chamber 28; the metal diaphragm 27 configured to contact with or separate from the valve seat 26; the first stem 21 and the second stem 24 configured to move the metal diaphragm 27 up and down; and the actuator unit 2 configured to drive the first stem 21. In the fluid control valve 1, the first flow passage 25c, 35c includes the first orifice 251 having the diameter R or the diameter T, set to 50% or less of the diameter of the circular flow passage, or, the second flow passage 25b, 35b includes a second orifice (not shown) having a diameter set to 50% or less of the diameter of the circular flow passage. Each of the diameters of the circular flow passages is a diameter calculated by converting a cylindrical flow passage area (a cylindrical surface area) (approximately Q$\pi$H) defined between the valve seat 26 and the metal diaphragm 27 when separated from the valve seat 26 into the diameter of a circular flow passage. This can reduce the variation rate of the Cv value to within ±10% or less even in supplying high-temperature gas.

(2) In the fluid control valve 1 described in (1), the diameter R of the first orifice 251 and the diameter T of the orifice 351 are respectively 40% or less of the diameter of the circular flow passage, or, the diameter of the second orifice (not shown) is 40% or less of the diameter of the circular flow passage. This can reduce the variation rate of the Cv value to within ±5% or less even in supplying high-temperature gas. This configuration can thus achieve a highly-accurate fluid control valve having a Cv value with a small variation rate (a variation rate of ±5% or less) in the ALD, as recently demanded in industry.

Third Embodiment

Figure 8:
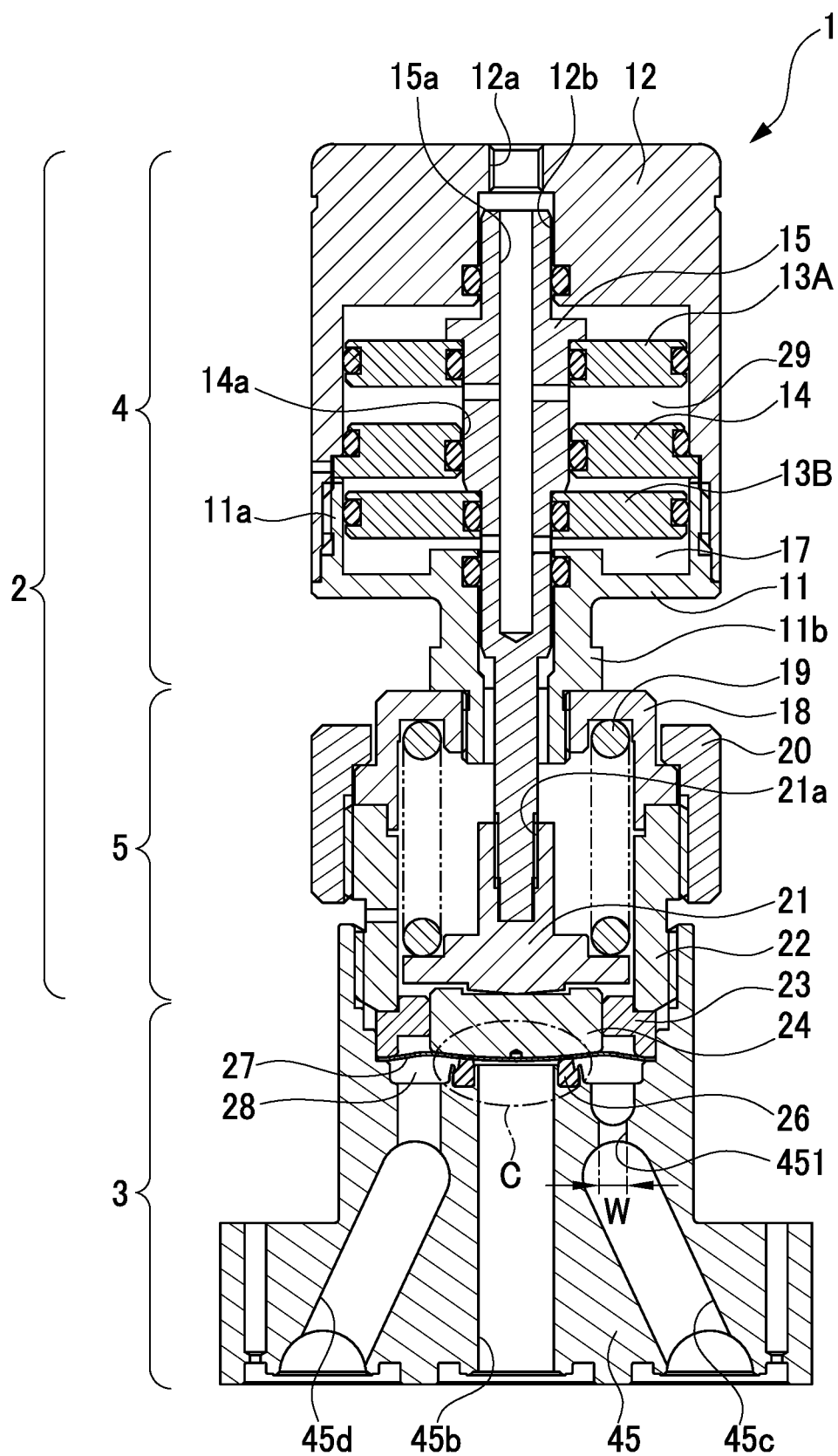
FIG. 8 is a sectional view of an entire fluid control valve in a third embodiment of the present invention, showing a valve closed state of a metal diaphragm.
Figure 9:
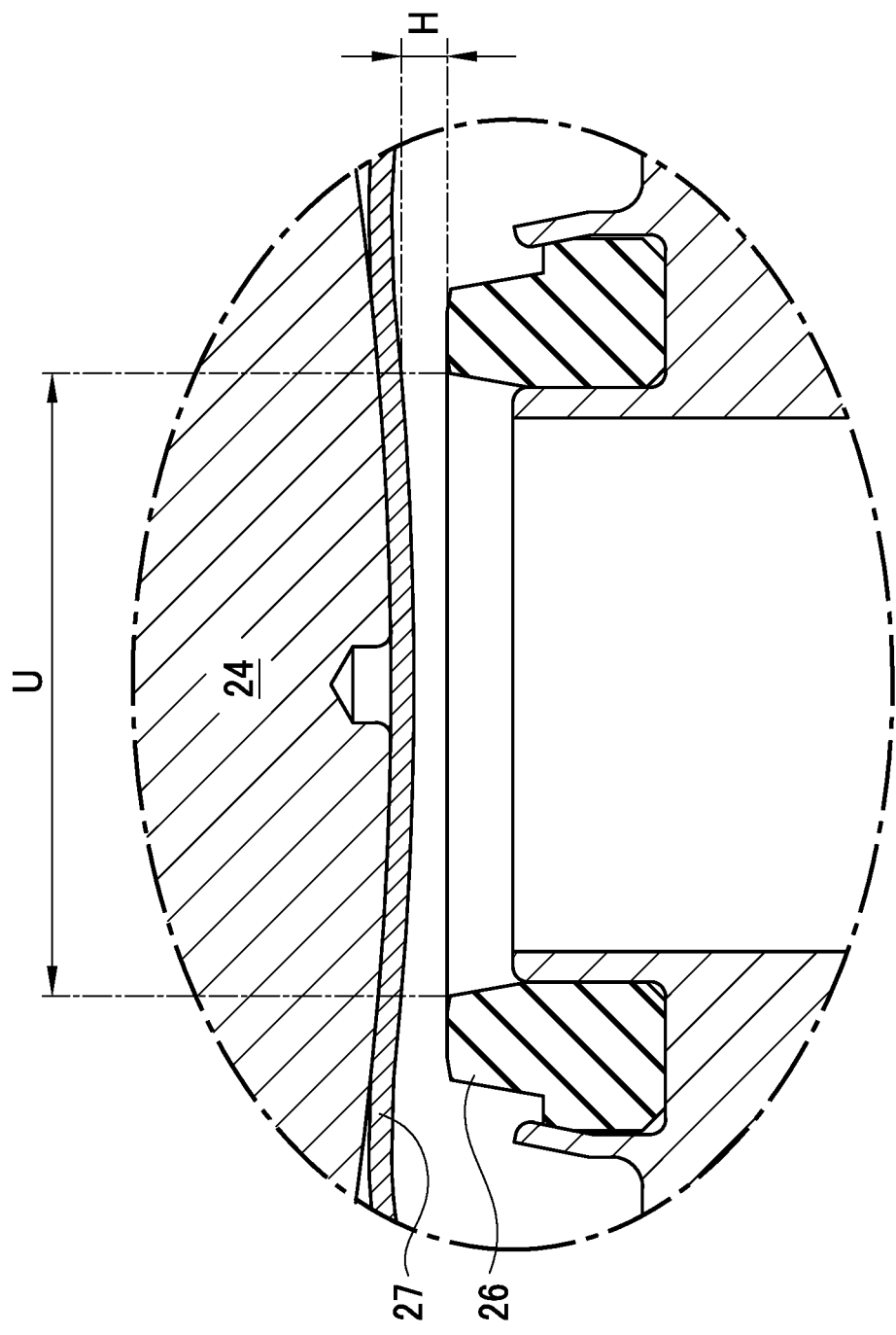
FIG. 9 is an enlarged view of a part C in FIG. 8, showing a valve open state of the metal diaphragm.
Figure 10:
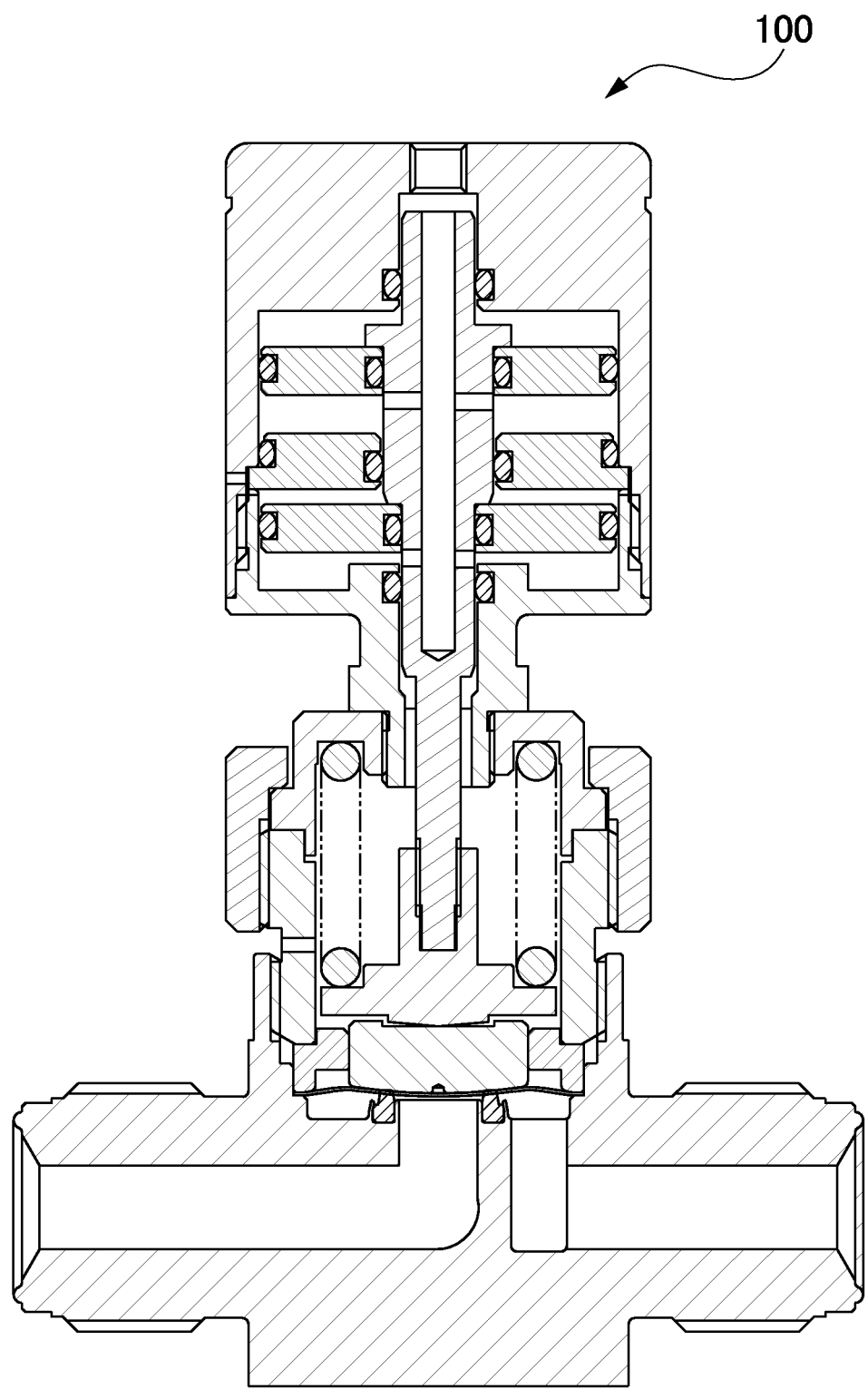
FIG. 10 is a sectional view of a conventional fluid control valve.

The configuration of a fluid control valve 1 in a third embodiment of the present invention will be described below with reference to FIGS. 8 and 9. FIG. 8 is a sectional view of the fluid control valve 1 in the third embodiment. FIG. 9 is an enlarged view of a part C in FIG. 8, showing a valve open state of the metal diaphragm 27.

The third embodiment differs from the first embodiment in the shape of flow passages in a valve body. Like components to those in the fluid control valve 1 in the first embodiment are assigned the same reference signs as those in the first embodiment and their details are omitted.

As shown in FIG. 8, a valve body 45 is formed with a second flow passage 45b and a third flow passage 45d on an input side and a first flow passage 45c on an output side. When the metal diaphragm 27 separates from the valve seat 26, material gas flowing in the second flow passage 45b and carrier gas flowing in the third flow passage 45d are both supplied to the first flow passage 45c via the valve chamber 28. On the other hand, when the metal diaphragm 27 is placed in a valve closed state, supply of the material gas and the carrier gas to the first flow passage 45c is stopped.

Furthermore, the carrier gas is continuously supplied in a flow rate controlled by another means to the first flow passage 45c via the third flow passage 45d and the valve seat 26.

The first flow passage 45c is formed with an orifice 451. The diameter W of this orifice 451 is set to 50% or less of the diameter of a circular flow passage calculated by converting a cylindrical flow passage area, i.e., an area of a cylindrical surface, of a cylindrical flow passage (i.e., a circumferential opening) defined between the valve seat 26 having an inner diameter U at its distal end and the metal diaphragm 27 when separated from the valve seat 26 into the diameter of the circular flow passage, as shown in FIG. 9. When the diameter W of the orifice 451 is set to 50% or less of the diameter U of the second flow passage 45b, the variation rate of the Cv value can be ±10% or less. When the diameter W of the orifice 451 is further set to 40% or less of the diameter U of the second flow passage, the variation rate of the Cv value can be ±5% or less.

The present embodiment is a mere example and does not impart any limitation on the present invention. The present invention thus may be embodied in other specific forms without departing from the essential characteristics thereof.

For example, the orifice is formed in the valve body in the present embodiments but may be provided as an additional component to the flow passage.

REFERENCE SIGNS LIST

1 Fluid control valve
2 Actuator unit
3 Valve unit
21 First stem
24 Second stem
25, 35 Valve body
25b, 35b Second flow passage
25c, 35c First flow passage
26 Valve seat
27 Metal diaphragm
28 Valve chamber
251, 351, 451 Orifice

The invention claimed is:

1. A fluid control valve for controlling high-temperature fluid, the fluid control valve comprising:
    a valve body including: a valve chamber communicating with a first flow passage and a second flow passage, and a valve seat provided in the valve chamber;
    a metal diaphragm configured to contact with and separate from the valve seat;
    a stem configured to move the metal diaphragm up and down; and
    an actuator configured to drive the stem, wherein
    the first flow passage includes a first orifice having a diameter of 50% or less of a diameter of a circular flow passage calculated by converting a cylindrical flow passage area defined between the valve seat and the metal diaphragm when separated from the valve seat into the diameter of the circular flow passage, or, the second flow passage includes a second orifice having a diameter of 50% or less of the diameter of the circular flow passage,
    the fluid control valve has a Cv value that varies between a minimum Cv value and a maximum Cv value due to unstable behaviors of the metal diaphragm due to heating by the high-temperature fluid,
    a flow passage area of the valve seat is defined as the cylindrical flow passage area between the valve seat and the metal diaphragm when the metal diaphragm is separated from the valve seat, and
    the first orifice or the second orifice has a flow passage area defined to provide a minimum Cv value that is more than 50%, the minimum Cv value being assumed to be 100% when the flow passage area of the first or second orifice is equal to the flow passage area of the valve seat.

2. The fluid control valve according to claim 1, wherein the high-temperature fluid is process gas of about 200° C.

3. The fluid control valve according to claim 1, wherein the high-temperature fluid is a high-temperature process gas vaporized by heat from a liquid state under a normal temperature.

4. The fluid control valve according to claim 1, wherein the metal diaphragm has a hardness of 500 Hv or more in terms of Vickers hardness.

5. The fluid control valve according to claim 1, wherein the minimum Cv value is between 50% and 100%.

* * * * *